May 21, 1940.  O. C. SCHMIDT  2,201,959
FEEDING MECHANISM
Filed Dec. 5, 1938   2 Sheets-Sheet 1
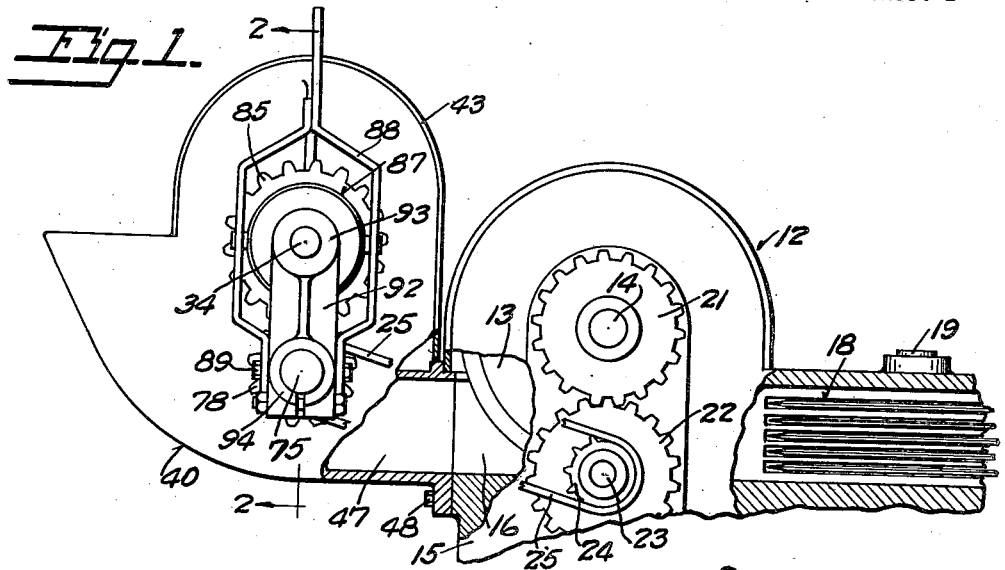
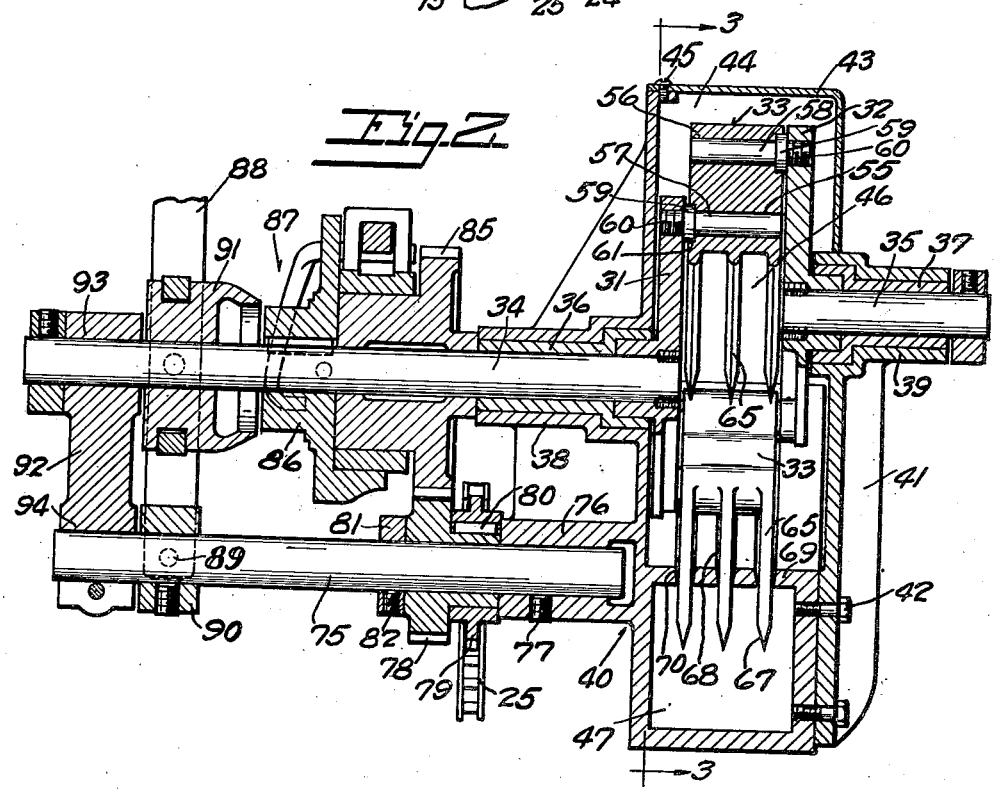
INVENTOR:
Oscar C. Schmidt.
by his Attorney May 21, 1940.  O. C. SCHMIDT  2,201,959
FEEDING MECHANISM
Filed Dec. 5, 1938  2 Sheets-Sheet 2
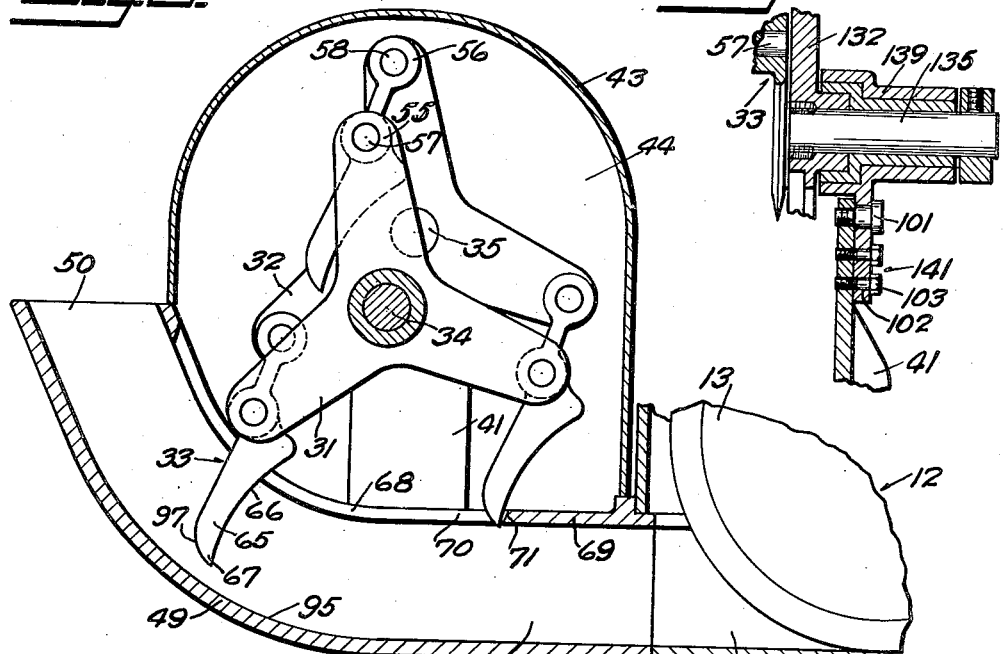
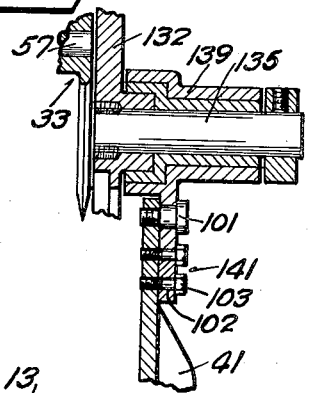
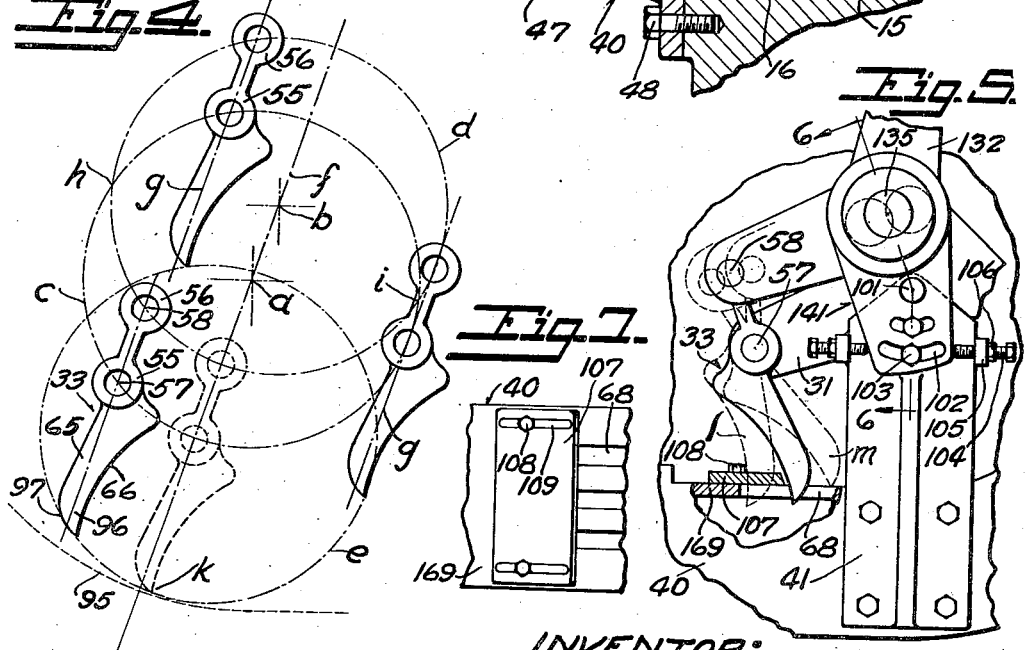
INVENTOR:
Oscar C. Schmidt Patented May 21, 1940

2,201,959

UNITED STATES PATENT OFFICE 2,201,959

FEEDING MECHANISM

Oscar C. Schmidt, Cincinnati, Ohio, assignor to The Cincinnati Butchers' Supply Company, Cincinnati, Ohio, a corporation of Ohio Application December 5, 1938, Serial No. 244,041

8 Claims. (Cl. 198—223)

My invention relates to feeding mechanism, and it is the object of my invention to provide novel means whereby material may be continuously fed.

This invention is especially useful for feeding loose material, material capable of being pressed into a continuous mass, plastic material, and the like, and is applicable in particular for feeding meat, fat and the like through a passage into the field of operation of an operating device which acts on the material thus fed, to cut, grind or otherwise act upon the same, or to cut the material into slabs, strips or cubes, in the butchering industry.

My invention consists in providing novel means for obtaining continuous advancing of the material; further, in novel means for subjecting the material to pressure during its advancing movement; further, in providing novel material engaging members for feeding, propelling or conveying the material; further, in poviding novel supporting and operating means for said members; further, in associating the feeding members with a passage for the material in novel manner; further, in providing novel feeding members operating in closed paths into, along and retractingly with relation to the passage for the material for obtaining continuous advancing movement of the material; and, further, in providing novel operating means for the same.

The invention will be further readily understood from the following description and claims, and from the drawings, in which latter:

Fig. 1 is a front elevation of a material operating device having my invention applied thereto, such operating device being exemplified as a cutting machine for cutting meats and fats into slabs, strips and cubes, partly in section and partly broken away.

Fig. 2 is a vertical cross-section of my improved device, taken on the line 2—2 of Fig. 1.

Fig. 3 is a vertical longitudinal section of the same, taken in the plane of the line 3—3 of Fig. 2.

Fig. 4 is a diagrammatic representation showing the paths of the feeding members and their relations to each other and to the axes of rotation of their carriers.

Fig. 5 is a side elevation showing a modification of my improved device, partly broken away.

Fig. 6 is a vertical cross-section of the same, taken on the line 6—6 of Fig. 5; and, Fig. 7 is a plan view of a detail of the same.

The material operating machine exemplified is a so-called cube cutter for cutting raw or boiled meats, fats and other products into slabs, strips or cubes. This machine is exemplified at 12, and is provided with rotary cutter blades 13, suitably fastened to a shaft 14, rotatably journaled in the frame 15 of the machine, the cutters being located so as to rotate in vertical planes and to operate in a passage 16 in the frame 15, the passage being preferably right-angular in cross-section and extending lengthwise of the machine, there being a number of such cutter blades on the shaft spaced axially at suitable distances apart, similarly to the spacings of the cutter blades 18, and arranged crosswise of the passage through which the material is fed to cause the material to be cut into a plurality of vertically disposed slabs.

Another similar group of cutters 18 is arranged crosswise of said passage, and secured in spaced relation on a suitable operating shaft 19 suitably driven, and suitably angularly disposed with relation to the first-named group of said cutters, so as to cut said slabs into strips. The material may be further acted on so as to be cut into cubes, as by means of a usual rotary cutter provided with usual scimitar cutter blades extending crosswise of and rotating across the end of the passage in suitable manner for cutting the strips of the material into cubes, not shown because well understood.

The shaft 14 has a gear 21 secured thereto. A gear 22 meshes with the gear 21 and is fixed to a shaft 23 journaled in the frame of the machine. The shaft 23 also has a sprocket wheel 24 fixed thereto, about which a sprocket chain 25 is looped. The shaft 23 is the driving shaft suitably driven.

The feeding mechanism exemplified comprises a pair of rotary members 31, 32, and constitutes rotary carriers for the feeding members 33, these carriers being shown in the form of spiders. The spiders are respectively secured to shafts 34, 35, journaled in bearing sleeves 36, 37, located in oppositely extended bearings 38, 39 of the frame or housing 40 of the machine. The bearing 39 and its bearing sleeve 37 may be mounted on a bracket 41 secured to the housing by bolts 42. A cover 43 is protectingly received about the space 44 in which the carriers 31, 32 and the feeding members 33 operate, the cover being secured to the housing by screws 45.

The carriers are spaced endwise from each other, affording a space 46 in which the feeding members 33 operate. One or more of the feeding members may be employed. The feeding members are successively projected into the feeding passage 47 of the feeding device, moved therealong, and then retracted with relation to the material, and returned to initial positions, in closed paths, for continuously feeding, propelling or conveying the material through the passage. The passage 47 of the feeding means is located in the housing 40, which is secured to the frame of the material operating machine, as by bolts 48.

The passage 47 of the feeding mechanism is shown as a part of the housing of the feeding mechanism, and is preferably cross-sectionally proportioned and formed to coincide with the passage 16 in the material operating machine, the latter passage forming a continuation of the former passage. The feeding passage 47 is provided with an arcuate portion 49, which slants upwardly and outwardly and terminates in a feeding mouth 50, conveniently positioned so that the operative may feed the meat, fat and the like into said mouth, or a suitable material supplying chute or material supplying part may connect with said mouth, the material thus received preferably descending into the sphere of action of the feeding members by gravity. The feeding members preferably operate in the passage at a point distant from the mouth to remove the danger of contact between them and the fingers and hands of the operative to prevent injury to the latter.

The axes of rotation extended of the rotary carriers and of the shafts on which they are mounted are spaced laterally from each other, so that said shafts and carriers rotate eccentrically with relation to each other. Each of the feeding members comprises a link which is provided with two bearings 55, 56, the axes of which are spaced apart laterally preferably a distance equal to the lateral spacing between the axes of rotation extended of said rotary carriers and their shafts. The rotary carrier 31 is provided with pivot studs 57, and the rotary carrier 32 is provided with pivot studs 58, these pivot studs being located respectively in the respective bearings 55, 56 of the links of the feeding member. The pivot studs project inwardly crosswise of the space 46 between the rotary carriers and are respectively provided with flanges 59 adjacent to the rotary carriers and are fixed to the respective rotary carriers, as by having threaded engagements 60 therewith. The flanges are respectively received and shouldered in enlargements 61 of the bores of the links of the bearings 55, 56 of the feeding members, to locate the feeding members endwise between the rotary carriers.

The lateral distance between the pivotal axes of the respective links of the feeding members is preferably substantially the same as the lateral distance between the axes of rotation extended of the rotary carriers and of their respective shafts. The pivotal axes of the links of the feeding members are preferably equidistantly angularly spaced on their respective carriers and their connections with said rotary carriers are preferably such that the pivotal axes of the respective links of the feeding members are located in planes which are parallel with each other throughout the planetary movements of said pivotal axes and preferably parallel with the plane in which the axes of rotation of said rotary carriers are located, the lateral distance between said axes of rotation and said respective pairs of pivotal axes being also preferably substantially the same. This manner of mounting the feeding members controls their movements with relation to each other and their movements with relation to the passage for the material.

While three of such feeding members are exemplified, it will be obvious that the number of such feeding members may be decreased or increased, their pivotal axes being located preferably at equal angular distances from each other about the respective rotary carriers, the number of feeding members being controlled by the character of the material being fed and to insure uninterrupted feeding of the material, preferably in such manner as to exert pressure on the material in the feeding operation, so that the material is forcefully fed through the passage and into the sphere of operation of the material operating device 12.

The feeding members are respectively provided with material contacting arms 65, forming material contacting portions or blades shown in the form of fingers having material feeding faces 66, the fingers terminating in tapering ends 67 which readily enter the body of material in the passage. These fingers are shown as movable in slots 68 in the inner wall 69 of the material passage. The side walls 70 of the slots preferably form wipers coacting with the side faces of said fingers for wiping material which may adhere to said fingers when being withdrawn from the material to retain the material in the passage, and the front faces 66 of said fingers preferably coact with the end walls 71 of said slots, acting as wipers for the material adhering to the advancing faces of said fingers.

A stub shaft 75 is fixed in a bearing 76, extending from the housing 40, there being a set screw 77 for clamping said stub shaft in said bearing. A gear 78 is journaled about said stub shaft and has a sprocket wheel 79 secured to its hub by means of a key connection 80. The sprocket chain 25 is received loopwise about said sprocket wheel for operating the same. The gear 78 is held endwise on its stub shaft by having the inner end of its hub engage the outer end of the bearing 76 at one end of said gear and having a collar 81 secured to the stub shaft by a set screw 82 at the other end of said gear.

The shaft 34 has a gear 85 thereabout. In the form shown it has journal bearing about this shaft and is held endwise on the shaft between the bearing 38 extending outwardly from the housing or frame of the feeding mechanism and a clutch member 86 fixed to said shaft. A suitable clutch 87 is located between this shaft and the gear and is arranged to be connected in clutched relation by means of an operating lever 88, pivoted at 89 to a collar 90 fixed to the shaft 75 and articulated with a suitable collar 91 of the clutch for moving the collar endwise in one direction to connect the clutch in clutched relation for transmitting power between said gear and said shaft and to be moved in opposite direction for unclutched relation of the clutch for discontinuance of rotation of the shaft.

A link 92 has a bearing 93 in which the outer end of the shaft 34 is journaled, and a bearing 94 shown as a clamp bearing arranged to be clamped about the outer end of the stub shaft 75.

In operation, the material is fed into the passage 47 through its feeding mouth 50 and gravitates or is urged into the field of operation of the feeding members 33. These feeding members are provided with feeding arms shown in the form of fingers 65, which enter the passage and the body of material therein in a direction transverse to the axis of the passage and preferably substantially perpendicular thereto, the entering ends of said feeding members moving crosswise of said passage while moving therealong into positions extending substantially across said passage so that the entering ends of said feeding portions operate adjacent to the outer wall 95 thereof. The feeding fingers continue their advancing movement until their pivotal connections with the carriers and the rotation of the carriers move the feeding members outwardly while continuing their advancing movement to be retracted with relation to the feeding passage and to move outwardly in planes substantially perpendicular to the axis of said passage.

By these means continuous forward feeding of the material is obtained without retarding movement upon the material due to retraction of the feeding members. Furthermore, at least one of the feeding members at all times extends substantially across the feeding passage, continuously insuring forward feeding movement of the material into the sphere of action of the material operating device, so that there is a continuous stream of material being fed into said device, the supply of material by my improved device being sufficiently copious to insure pressure upon the material being supplied to the material operating machine 12.

A diagrammatic representation of the operation of the feeding members is exemplified in Fig. 4, the action of the feeding members being also illustrated in Fig. 3.

In the present exemplification the carrier 31 controls the planetary paths of the feeding members by means of their pivotal connections 55, 57 with said carrier, and the carrier 32, by means of the pivotal connections 56, 58 therewith, and the relations of the pivotal connections between the feeding members and the carriers, controls the directions in which the feeding members extend in said planetary paths. In the present exemplification, the carrier 31 forms the driving member of the assembly to move the feeding members in their planetary paths, and the feeding members by their pivotal connections with the carrier 32, rotate the latter, the angle of presentation of the feeding members to the material being controlled by the relations of their pivotal connections with the carriers.

Referring to Fig. 4 the point $a$ represents the axis of rotation of the carrier 31 and the point $b$ represents the axis of rotation of the carrier 32. The dotted circle $c$ represents the path of the pivotal axes of the pivotal connections 55, 57 between the feeding members and the carrier 31, and the dotted circle $d$ represents the path of the pivoted axes of the pivotal connections 56, 58 between the feeding members and the carrier 32, to determine the planetary path of the feeding members and the directions in which the feeding members including their links extend in said paths. The dotted circle $e$ represents the path of the feeding ends 96 of the feeding members. With the arrangement of the axes stated, the axes of rotation $a$ and $b$ are located in a plane represented by the dotted line $f$, and the pivotal axes of the pivotal connections of the respective feeding members are located in planes represented by the dotted lines $g$, which planes it will be noted are parallel with the plane $f$ in which the axes of rotation of the respective carriers are located.

The paths of the pivotal axes extended intersect each other as exemplified by the crossing points of the dotted circles at $h$ and $i$, and the feeding ends of the feeding members are, during their feeding movements, located outside the cylindrical projections of said circles $c$ and $d$, and during a portion of their retracting movements, are located within said cylindrical projections. The outer ends of the feeding members move closely to the inner faces of the outer wall 95 of the feeding passage at their points of closest approach thereto, as represented at $k$, so as to exert feeding pressure upon the entire mass of material in the passage. These relations of axes and paths are given as exemplifications and not as limitations.

The material being fed is forcefully propelled through the passage in abundant quantity to compress the material in the passage between the feeding members and the material operating device, so that the material in such location forms a compressed body of material in which the pieces of meat and fat being operated on form substantially a continuous mass on which the cutting devices operate with especial nicety and precision for cutting the material into slabs, strips and cubes. The feeding fingers are also wiped by the walls at the sides and inner ends of the slots so as to keep the fingers free of material when they are retracted from the material. Uninterrupted forceful feeding of the material is accomplished by means of my improved device.

To further insure nicety of operation, the advancing forward face 66 of the feeding member is sloped rearwardly and outwardly in its planetary path so as to urge the material into the passage retreatingly from its inner wall, and the rear face 97 of the outer end of said feeding member is curved toward the outer wall of the passage and forwardly to urge the material from the slots into the passage during retracting movement of the feeding member.

While the arrangement of the pivotal axes of the respective feeding members and the axes of rotation of their carriers and their angular arrangement as herein explained, is recommended, the feeding members may be otherwise presented, an exemplification of which is shown in the modification illustrated in Figs. 5, 6 and 7, in which the parts are designated by similar reference numerals, with the reference numerals of the modified parts being raised to the series 100.

Thus the carrier 132 may be mounted upon an adjustable supplemental support 141, which is adjustable about the axis of rotation extended of the carrier 31, preferably to maintain the distance between pivotal axes of the respective feeding members. The support 141 is shown pivoted on a stud 101, whose axis is in line with the axis of rotation of the carrier 31 and its shaft 34. The support is provided with arcuate slots 102, whose curvature has the axis of rotation of the carrier 31 and its shaft as a center, the support being fixed in adjusted positions by means of clamp bolts 103 in said slots threaded into the bracket 41.

The supplemental support may be further secured in adjusted position by means of bolts 104, threaded in lugs 105, extending from the outer face of the bracket 41, the inner ends of said bolts contacting the end of the supplemental support 141 for adjustably positioning the same, these bolts being clamped in adjusted positions by means of clamp nuts 106.

In the modification shown in Figs. 5, 6 and 7, adjustment of the axis of rotation $b$ of the carrier 32 about the axis of rotation of the carrier 31 changes the angular relation between the carrier 31, which controls the planetary paths of the feeding members and the carrier 32, which controls the angles in which said feeding members are located in their paths. Adjustment of the supplemental support 141 controls the angular positions of the feeding members in their planetary paths, either advancing or retracting the outer ends of the feeding portions thereof, as exemplified, for instance, by the dotted line positions *l* and *m* of the feeding member in Fig. 5.

The adjustment of such angular position may be accompanied by adjustment of the location of the end walls of the slots in which the feeding fingers move, obtained, for instance, by means of an adjustable plate 107 (Fig. 7), adjustably located on the inner wall 169 of the passage, toward and from the normal paths of the feeding portions of the feeding members, so as to cover more or less of the inner ends of the slots. The slots may be longitudinally enlarged at both ends for accommodating different locations of the paths of movement of the feeding members. The adjustable end plate forms an adjustable end wall for the outfeeding ends of said slots and wiping walls for the forward feeding faces 66 of the feeding fingers. The plate may be secured in adjusted positions by means of clamp bolts 108 passing through slots 109 extending lengthwise of the direction of feed of the material and threaded into the inner wall 169 of the passage.

The adjustment of the axis of one carrier about the axis of the other may be of indefinite extent to adjust the angular relation between said carriers, and to cause the feeding action to take place at any angular portion of the carriers, to feed the material in lateral direction or upwardly or downwardly, as may be desired.

It is of course obvious that changes may be made in the parts and devices and the arrangements thereof, which I have preferred to show, without departing from my invention expressed in the appended claims.

My invention provides simple, accurate and rapid feeding means for the material and forms economical means whereby the material is continuously fed to the field of operation of the operating device, so as to continuously feed a compact mass of the material to the material operating device in order to provide uniformity of product.

I claim:

1. In a continuous feeding mechanism, the combination of a material feeding member, spaced pivots on said member, a rotatable carrier for each of said pivots, the axes of rotation of said carriers being spaced laterally from each other, the normal angular relation between the pivotal axes of said respective pivots carried by said respective rotatable carriers controlling the normal angular position of said material feeding member, and means whereby to adjust the angular relation between said pivotal axes of said pivots whereby to alter said normal angular position of said material feeding member.

2. In material feeding means, the combination of a passage for the material, a feeding member presented at an angle to the axis of said passage and movable in feeding direction in said passage, and in return direction retractingly with relation to said passage, an actuating link for said feeding member, a rotatable carrier for said link to which said link is pivoted, a second rotatable carrier for said link to which said link is pivoted at a point on said link spaced from said first-named pivot, the axes of rotation of said carriers being spaced laterally from each other and from said passage, and the plane in which said pivotal axes extend defining the angle at which said feeding member is presented to the axis of said passage, and means for changing the lateral relation between the axes of said pivots whereby to change the angularity of said plane in order to change the angularity of said actuating link and of said feeding member actuated thereby.

3. Continuous feeding means comprising in combination a substantially cross-sectionally closed passage for the material to be fed, an elongated opening in one wall of said passage extending lengthwise of said passage, a feeding member provided with a material engaging portion adapted to enter said elongated opening and move in said passage in feeding direction and retractingly with relation to said passage in return direction in a closed path, a rotatable carrier for said feeding member mounted for rotation outside said passage to move said feeding member in said closed path, and position qualifying means coacting with said feeding member to control the angular presentation of said feeding member in said closed path with relation to said passage.

4. Feeding means comprising in combination a pair of parallelly disposed rotatable carriers whose axes of rotation are spaced laterally from each other, a pivotal connection on each of said carriers spaced laterally from the axis of rotation of its respective carrier, a feeding member, an actuating link for said feeding member controlling the angle of presentation of said feeding member to the material being fed, said actuating link being provided with pivotal connections connected respectively with said first-named pivotal connections on said carriers and spaced from each other a distance corresponding to the space between the axes of rotation of said carriers, and means whereby one of said pivotal connections between said link and one of said carriers is adjustable about the axis of rotation of the other of said carriers whereby to adjust said angle of presentation of said feeding member.

5. In combination, a feeding passage provided with a slot, a material conveying member movable in said slot transversely to and lengthwise of said slot, and mounting means for said conveying member to move said conveying member transversely to said passage in paths substantially perpendicular to the axis of said passage while moving said conveying member lengthwise of said passage, and said conveying member provided with a forward conveying face sloping rearwardly into said slot whereby to urge the material into said passage during conveying movement thereof to resist leakage of the material out of said slot.

6. In feeding mechanism, the combination of feeding members, operating links for said feeding members, rotary carriers having laterally separated pivotal connections with said respective operating links, the pivotal axes of said pivotal connections being angularly spaced on said respective carriers, said carriers having axes of rotation offset laterally with relation to each other and within the annular paths of said respective pivotal connections, whereby to move said operating links and said feeding members at controlled angles in planetary paths about said axes of rotation, and means whereby to relatively adjust an axis about another axis as a center to adjust the controlled angles of the operating links and of the feeding members in their planetary paths.

7. In feeding mechanism, the combination of feeding members having material contacting portions, a passage for the material having an opening in which said material contacting portions move to sequentially enter, move along and recede and retract relatively to said passage, a wiper at the end of said opening for said material contacting portions, rotary carriers having laterally separated pivotal connections with said respective feeding members, the pivotal axes of said pivotal connections being angularly spaced on said respective carriers, said carriers having axes of rotation offset laterally with relation to each other, whereby to move said feeding members in planetary paths about said axes of rotation, means whereby to relatively adjust an axis about another axis as a center to adjust the angle of the feeding members in their planetary paths, and means to adjust said wiper to accommodate the adjusted angle of said feeding members.

8. In material feeding means, the combination of a feeding member including a material feeding part having a normal angle of presentation to the material to move the material and an actuating link, a rotatable carrier, a pivot between said link and said rotatable carrier, a second rotatable carrier, a second pivot between said link and said second rotatable carrier at a point on said link spaced from said first-named pivot to present said feeding part at a normal angle to the material, the axes of rotation of said carriers being spaced laterally from each other, and means whereby to adjust the relative location between said axes of rotation of said carriers for angular adjustment of said link between the pivotal axes of said pivots to change said normal angle of presentation of said feeding part to the material.

OSCAR C. SCHMIDT.